US 9,303,176 B2

(12) United States Patent
Beek et al.

(10) Patent No.: US 9,303,176 B2
(45) Date of Patent: Apr. 5, 2016

(54) HOT MELT INK COMPOSITION, METHOD FOR PREPARING A HOT MELT INK COMPOSITION AND USE OF A HOT MELT INK COMPOSITION

(71) Applicant: OCE-TECHNOLOGIES B.V., Venlo (NL)

(72) Inventors: Dannis W. H. Beek, Swalmen (NL); Leonardus F. H. Roodbeen, Venlo (NL); Tieme A. Van Den Berg, Aduard (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/595,981

(22) Filed: Jan. 13, 2015

(65) Prior Publication Data

US 2015/0124030 A1    May 7, 2015

Related U.S. Application Data

(63) Continuation of application No. PCT/EP2013/064650, filed on Jul. 11, 2013.

(30) Foreign Application Priority Data

Jul. 24, 2012  (EP) .................................... 12177667

(51) Int. Cl.
*B41J 2/01* (2006.01)
*C09D 11/38* (2014.01)
(Continued)

(52) U.S. Cl.
CPC .............. *C09D 11/38* (2013.01); *B41J 2/17593* (2013.01); *B41J 2/2107* (2013.01); *C08K 3/04* (2013.01); *C08K 5/12* (2013.01); *C08K 5/3437* (2013.01); *C09D 11/34* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............................................... 347/88, 99, 103
See application file for complete search history.

(56) References Cited

U.S. PATENT DOCUMENTS

| 4,931,095 A | 6/1990 | Nowak et al. |
| 6,685,953 B1 | 2/2004 | Hoshino et al. |

(Continued)

FOREIGN PATENT DOCUMENTS

| EP | 1067157 A1 * | 1/2001 | ............. C09D 11/00 |
| EP | 1 221 467 A1 | 7/2002 | |

*Primary Examiner* — Manish S Shah
(74) *Attorney, Agent, or Firm* — Birch, Stewart, Kolasch & Birch, LLP (57) ABSTRACT

The invention relates to a hot melt ink composition, the hot melt ink composition being solid at room temperature and in a liquid state at an elevated temperature, including a binder, a colorant, a crystalline material, and a crystallization retardant, wherein the crystalline material is a di-substituted compound and the crystallization retardant is a mono-substituted derivative of the crystalline material. The invention further relates to a method for preparing such hot melt compositions and to use of a hot melt ink composition.

10 Claims, 2 Drawing Sheets

(51) Int. Cl.
*B41J 2/21* (2006.01)
*B41J 2/175* (2006.01)
*C09D 11/34* (2014.01)
*C08K 3/04* (2006.01)
*C08K 5/12* (2006.01)
*C08K 5/3437* (2006.01)

(56) References Cited

U.S. PATENT DOCUMENTS 7,084,190 B2  8/2006  Everhardus et al.
2002/0124771 A1* 9/2002 Hendricks ............. C09D 11/34
　　　　　　　　　　　　　　　　　　　　　　　106/31.29

* cited by examiner

HOT MELT INK COMPOSITION, METHOD FOR PREPARING A HOT MELT INK COMPOSITION AND USE OF A HOT MELT INK COMPOSITION

CROSS REFERENCE TO RELATED APPLICATIONS

This application is a Continuation of PCT International Application No, PCT/EP2013/064650, filed on Jul. 11, 2013, which claims priority under 35 U.S.C. 119(a) to Patent Application No. 12177667,8, filed in Europe on Jul. 24. 2012, all of which are hereby expressly incorporated by reference into the present application.

The present invention relates to a hot melt ink composition. The present invention further relates to a method for preparing a hot melt ink composition and use of a hot melt ink composition.

BACKGROUND OF THE INVENTION

Hot melt ink compositions are known in the art.

A hot melt ink composition is an ink composition that is solid at room temperature and liquid at elevated temperature. Inks of this kind are also known as meltable inks or phase change inks. Known hot melt ink compositions comprise for example a crystalline material, a colorant and a binder.

In a printing device, for example an ink jet printer, the ink is melted and transferred to substantially closed ink ducts which lead at one end into an orifice. As a result of a sudden pressure rise in the duct, produced for example by rapidly reducing the volume of the ink duct or rapidly evaporating some of the ink in the duct, a drop of ink may be ejected from the duct through the orifice. In this way an image may be built up from individual ink drops on a receiving medium. Hot melt inks contain a carrier material with a melting point higher than room temperature. The ink may melt in the printing device. Hot melt inks of this kind have the advantage that they set rapidly on the receiving medium, so that the print quality is less dependent on the type of receiving medium. Print quality is an important aspect for evaluating the quality of a hot melt ink composition.

EP 1 221 467 B1 describes a hot melt ink composition, the hot melt inkjet ink composition being solid at room temperature and liquid at an elevated temperature, comprising a binder, a colorant and a crystalline material, wherein the crystalline material is a compound according to where $R_1$ and $R'_1$ are the same or different and are selected from a C1-8 alkyl or a C1-8 alkoxy group, $R_2$ is a C1-12 linear alkane diyl or a C5-12 alkane diyl containing a cyclic group, and n and m are the same or different and are equal to 1, 2 or 3. However, regarding print quality, there is room for improvement.

It is therefore an object of the invention to provide a hot melt inkjet ink composition providing printed images with an improved print quality. It is a further object of the invention to provide a method for preparing a hot melt inkjet ink composition that provides printed images with an improved print quality.

SUMMARY OF THE INVENTION

The object is achieved in a hot melt ink composition, the hot melt ink composition being solid at room temperature and in a liquid state at an elevated temperature, comprising a binder, a colorant, a crystalline material and a crystallization retardant, wherein the crystalline material is a di-substituted compound and the crystallization retardant is a mono-substituted derivative of the crystalline material.

Binder

The hot melt ink composition according to the present invention may comprise a binder. This binder may be for example a wax or a resin, or a combination thereof. The use of resins in ink compositions has the advantage that dyes can be dissolved relatively well therein and pigments can be dispersed relatively easily therein. A number of non-limiting examples of resins, suitable to be used as binder in a hot melt ink composition are copolyester resins, polyamide resins, rosin resins, polyesteramide resins, epoxy resins, polyvinylalcohol resins, cellulose esters, cellulose ethers and polyvinyl pyridine resins. These resins may be used alone or in combination.

Synthetic or natural waxes may also be used as a base material in hot melt inks. Waxes may efficiently disperse or dissolve colorants, such as pigments or dyes. A number of non-limiting examples of waxes, suitable to be used as binder in a hot melt inkjet ink composition, are polyalkylene waxes, such as polyethylene waxes or polypropylene waxes, Fischer-Tropsch waxes, lineary primary alcohols, such as Unilin™ alcohol waxes (available from Baker Hughes), microcrystalline waxes, fatty acids, carnauba wax, candelilla wax, stearamides, paraffin wax and montan wax and ethoxylated long chain alcohols, such as Unithox™ (available from Baker Hughes). The waxes may be used alone or in combination. Moreover, a combination of waxes and resins may be used.

Colorant

The hot melt ink composition may further comprise a colorant. The colorant may be a pigment, a mixture of pigments, a dye, a mixture of dyes, a mixture of a dye and a pigment or a mixture of more than one dye and more than one pigment. Pigments are preferred, because of their superior color fastness with respect to dyes.

Crystalline Material

The hot melt ink composition according to the present invention may comprise a crystalline material. The hot melt composition comprising the crystalline material may be kept in an ink reservoir at high temperature, such that the hot melt composition is in a molten state. When the hot melt ink composition is in a molten state, the ink composition may be applied onto a receiving medium, for example by jetting droplets of the ink onto a receiving medium.

After the ink has been applied onto the receiving medium, the hot melt ink composition may cool down and solidify. When cooling down, the crystalline material may crystallize. By crystallizing, the crystalline material may form crystalline regions in the ink applied onto the receiving medium. The presence of these crystalline regions may influence the properties of the solidified ink. For example, the presence of the crystalline regions may improve the print robustness of the ink applied onto the receiving medium. Furthermore, the presence of crystalline regions within the image applied onto the receiving medium may influence the appearance of the image.

The crystalline material may be a di-subsituted component.

Crystallization Retardant

As mentioned above, the crystalline material may crystallize from the hot melt ink composition. By crystallization of the crystalline material, crystalline regions may be formed in the ink layer applied onto the receiving medium. The crystalline regions may influence the robustness and the appearance of the print. Upon cooling of the hot melt ink composition, the crystalline material may crystallize from the hot melt ink composition. The rate of crystallization may depend on parameters such as temperature, but it may also depend on the composition of the hot melt ink composition. Moreover, the rate of crystallization may be influenced by the receiving medium. For example, irregularities in the surface of the receiving medium may influence the crystallization rate. Additionally, the presence of contaminants on the receiving medium may influence the crystallization process. The rate of crystallization may be decreased by the addition of crystallization retardant. Surprisingly, it was found, that by addition of the crystallization retardant, the quality of the print was improved.

The crystallization retardant may be a mono-substituted derivative of the crystalline material.

In an embodiment, the crystalline material is a di-substituted component having the following general formula:

Formula 1 wherein:

$R_2$ is a C1-12 linear alkane diyl or a C5-12 alkane diyl containing a cyclic group;

$B_1$ and $B_2$ may be the same or different and are both selected from the group of —C(O)O—, —OC(O)—, —C(O)N(H)—, —N(H)C(O)— and —O—; where $R_1$ and $R'_1$ are the same or different and are selected from a C1-8 alkyl or a C1-8 alkoxy group, and n and m are the same or different and are equal to 0, 1, 2 or 3.

The C1-12 linear alkane diyl or a C5-12 alkane diyl containing a cyclic group, as well as the C1-8 alkyl or C1-8 alkoxy groups may be selected from the groups described below. The crystalline material may comprise an ester group, and/or an amide group and/or an ether group. A crystalline material comprising an ester group may be synthesized by coupling an carboxylic acid to an alcohol. A crystalline material comprising an amide group may be synthesized by coupling an carboxylic acid to an amine. A crystalline material comprising two ester groups may be obtained by reacting a dicarboxylic-acid with two equivalents of an alcohol, or by reacting a compound comprising two hydroxyl groups with two equivalents of a carboxylic acid. Alternatively, crystalline material comprising two ester groups may be obtained by reacting a hydroxyl-carboxylic acid with one equivalent of a mono-carboxylic acid and one equivalent of a component comprising a hydroxyl group.

A crystalline material comprising two amide groups may be obtained by reacting a dicarboxylic-acid with two equivalents of an amine, or by reacting a di-amine with two equivalents of a carboxylic acid. Alternatively, crystalline material comprising two amide groups may be obtained by reacting an amino acid with one equivalent of a mono-carboxylic acid and one equivalent of a hydroxyl group.

In an embodiment, $B_1$ may be —C(O)O— and B2 may be —OC(O)—, or $B_1$ may be —C(O)N(H)— and B2 may be —N(H)C(O)—, or $B_1$ and $B_2$ may be —O—.

In an embodiment, $R_1$ and $R'_1$ are the same. When the substituents on the aromatic rings on both sides of the crystalline material are the same, this may increase the symmetry of the crystalline material, thereby increasing the crystallinity of the material.

In an embodiment, the crystalline material may have a viscosity in the range of 3 mPa.s to 50 mPa.s at 130° C., for example from 6 mPa.s to 30 mPa.s, at 130° C., such as from 7 mPa.s to 22 mPa.s, at 130° C.

In an embodiment, the crystallization retardant has the following general formula:

Formula 2 wherein $R_3$ is selected from a C1-8 alkyl or a C1-8 alkoxy group, $R_4$ is a C1-12 linear or branched alkyl and n' is equal to 0, 1, 2 or 3 and $B_1$ is selected from the group of —C(O)O—, —OC(O)—, —C(O)N(H)—, —N(H)C(O)— and —O—.

The molecular structure of the crystallization retardant may resemble the molecular structure of the mono-substituted derivative of the crystalline material. However, the mono-substituted derivative of the crystalline material may comprise an unreacted functional group, such as an alcohol, an amine, an epoxy or carboxylic acid group. This unreacted functional group may show reactivity towards other components of the hot melt ink composition, or towards the print head when the ink is in the print head. Especially at higher temperatures, the unreacted functional groups may show reactivity. For example, they may degrade other components of the hot melt ink composition, such as esters or amides. For example, these esters or amides may be hydrolyzed in the presence of water, leading to degrading of the ink composition. Because hot melt ink compositions may be jetted at high temperatures, the hot melt ink compositions may be generally stored in an ink reservoir at elevated temperature, to allow the ink to be jetted. Thus, it is preferred not to have mono-substituted derivative of the di-substituted crystalline component comprising unreacted functional groups.

In an embodiment, $R_3$ is equal to at least one of $R_1$ and $R_1$'. In case $R_3$ is equal to at least one of $R_1$ and $R_1$', the molecular structures of the crystalline material and the aromatic mono-ester may resemble one another. As a result, the aromatic mono-ester may co-crystallize more easily with the crystalline material upon cooling of the ink on the receiving medium.

In a further embodiment, in case $R_3$ is equal to $R_1$, then n' is equal to n. Preferably, the substitution pattern on the aromatic ring—i.e. the number of substituent and the position of the substituents on the ring—for the aromatic mono-ester is equal to the substitution pattern on at least one of the aromatic rings of the crystalline material. The more similar the molecular structures of the crystalline material and the aromatic mono-ester, the more compatible the aromatic mono-ester and the crystalline material may be.

In an embodiment, the viscosity of the crystallization retardant may have a lower viscosity than the crystalline material. Thus, by adding the crystallization retardant to the hot melt ink composition comprising the crystalline material, the viscosity of the hot melt ink composition may be lowered. A lower viscosity may improve jettability of the hot melt ink composition in an inkjet application.

In an embodiment, the crystalline material is a compound according to formula 3:

Formula 3 where $R_1$ and $R'_1$ are the same or different and are selected from a C1-8 alkyl or a C1-8 alkoxy group, $R_2$ is a C1-12 linear alkane diyl or a C5-12 alkane diyl containing a cyclic group, and n and m are the same or different and are equal to 0, 1, 2 or 3. Preferably, n and m are the same or different and are equal to 1, 2 or 3.

The crystalline material according to Formula 3 comprises two ester moieties that are spaced apart by the group $R_2$. $R_2$ may be a C1-12 linear alkane diyl or a C5-12 alkane diyl containing a cyclic group. For example, $R_2$ may be selected from —$CH_2$—, —$CH_2CH_2$—, —$CH_2CH_3CH_2$—, —CH($CH_3$)$Ch_2$—, —CH2($CH_3$)$_2$CH2—, —$CH_2CH(CH_3)$ $CH_2$—, —$CH_2(CH_{26})_3CH_2$—, —$CH_2CH(CH_2CH_3)$ $CH_2)$—, —$CH_2CH(CH_3)CH_2CH_2$—, —$(CH_2)_6$—, —$CH_2CH(CH_2CH_2CH_3)CH_2$—, —$(CH_2)_2CH(CH_3)$ $(CH_2)_2$—, —$(CH_2)_7$—, —$(CH_2)_2CH(CH_2CH3)(CH_2)_2$—, —$(CH_2)_8$—, —$(CH_2)_3CH(CH_3)(CH_2)_3$—, $(CH_2)_2CH$ $(CH_2CH_2CH_3)(CH_2)_2$—, $CH(CH_3CH_2CH(CH_3)CH_2CH$ $(CH_3)$—, —$(CH_2)_9$—, —$(CH_2)_3CH(CH_2CH_3)(CH_2)_3$—, —$(CH_2)_2CH(CH_3)CH_2CH(CH_3)CH_2CH_2$—, —$(CH_2)_{10}$—, —$(CH_2)_4CH(CH_3)(CH_2)_4$—, —$(CH_2)_3CH(CH_2CH_2CH_3)$ $(CH_2)_3$—, —$CH_2CH(CH_3)CH_2CH(CH_3)CH_2CH(CH_3)$ $CH_2$—, —$(CH_2)_{11}$—, —$(CH_2)_4CH(CH_2CH_3)(CH_2)_4$—, $(CH_2)_2CH(CH_3)(CH_2)_3CH(CH_3(CH_2)_2$—, —$(CH_2)_{12}$—, —$(CH_2)_5CH(CH_3)(CH_2)_5$—, —$(CH_2)_4CH(CH_2CH_2CH_3)$ $(CH_2)_4$—, —$(CH_2)_2CH(CH_2CH_3)(CH_2)_2CH(CH_2CH_3)$ $(CH_{22}$—, —$CH_2CH(CH_3)(CH_2)_2CH(CH_3)(CH_2)_2CH$ $(CH_3CH_2$—, —$(CH_2)_2CH(CH_3)CH_2CH(CH_3)CH_2CH$ $(CH_3)(CH_2)_2$—, —$C_5H_8$—, —$C_5H_4$—, —$C_6H_{10}$—, —$C_6H_4$—, —$CH_2C_5H_4CH_2$—, —$CH_2C_5H_8CH_2$—, —$C_7H_{12}$—, —$C_8H_{14}$—, —$C_8H_{10}$—, $CH_2C_6H_4CH_2$—, —$CH_2C_6H_{10}CH_2$—, —$(CH_2)_2C_5H_8(CH_2)_2$—, —$(CH_2)_2C_5H_4(CH_2)_2$—, —$CH_2C_5H_6(CH_3)_2CH_2$—, —$CH_2C_5H_2(CH_3)_2CH_2$—, $CH_2C_7H_{12}CH_2$—, —$CH_2C_6H_3$ $(CH_3)CH_2$—, —$CH_2C_6H_7(CH_3)CH_2$—, —$(CH_2)_2C_6H_4$ $(CH_2)_2$—, —$(CH_2)_2C_6H_8(CH_2)_2$—, —$CH_2C_6H_2$ $(CH_3)_2CH_2$—, —$CH_2C_6H_6(CH_3)_2CH_2$—, —$CH_2C_8H_{14}CH_2$—, —$CH_2C_8H_{10}CH_2$—, —$(CH_2)_3C_5H_8$ $(CH_2)_3$—, —$(CH_2)_3$—, —$(CH_2)_3C_5H_4(CH_2)_3$—, —$(CH_2)_2C_6H_4(CH_2)_3$—, —$(CH_2)_2C_6H_8(CH_2)_3$—, —$(CH_2)_2C_7H_{12}(CH_2)_2$—, —$CH_2C_7H_{10}(CH_3)_2CH_2$—, —$C_6H_4C_5H_4$—, —$C_6H_8C_6H_8$—, —$C_6H_4C_6H_8$—, —$(CH_2)_3C_6H_4(CH_2)_3$—, —$(CH_2)_3C_5H_8(CH_2)_3$—, —$(CH_2)_2C_6H_2(CH_3)_2(CH_2)_2$—, —$(CH_2)_2C_6H_4(CH_3)_2$ $(CH_2)_2$—, —$(CH_2)_2C_8H_{10}(CH_2)_2$—, —$(CH_2)_2C_8H_{14}$ $(CH_2)_2$—, —$CH_2C_8H_8(CH_3)_2CH_2$—, —$CH_2C_8H_{12}$ $(CH_3)_2CH_2$—.

The crystalline material may comprise groups $R_1$ and $R_1'$. $R_1$ and $R_1'$ may be selected from a C1-8 alkyl or a C1-8 alkoxy group. The C1-8 alkyl group may be e.g. methyl, ethyl, n-propyl, i-propyl, n-butyl, i-butyl, t-butyl, n-pentyl, i-pentyl (—$CH(CH_3)(CH_2CH_2CH_3)$), —$CH(CH_3)(CH(CH_3)_2)$, tert-pentyl (—$CH(CH_3)_2(CH_2CH_3)$, neo-pentyl (—$CH_2C$ $(CH_3)_3)$, n-hexyl (—$(CH_2)_5CH_3$)), —$(CH_2)_3CH(CH_3)_2$, —$(CH_2)_2CH(CH_3)(CH_2CH_3)$, —$CH_2CH(CH_3)$ $(CH_2CH_2CH_3)$, —$CH(CH_3((CH_2)_3CH_3)$, —$CH_2CH(CH_3)$ $(CH(CH_3)_2$, —$CH(CH_3)(CH_2CH(CH_3)_2)$, —$CH(CH_3)(CH$ $(CH_3)(CH_2CH_3))$, —$CH(CH_3)((CH_2)_3CH_3)$, —$CH(CH_3)$ $(CH_2CH(CH_3)_2)$, —$CH(CH_3)(CH(CH_3)(CH_2CH_3))$, —CH $(CH_3)(CH_2CH_3)_2$, —$CH(CH_2CH_3((CH_2)_2CH_3)$, —CH $(CH_2CH_3)(CH(CH_3)_2)$, n-heptyl (—$(CH_2)_6CH_3)$), —$(CH_2)_4CH(CH_3)_2$, —$(CH_2)_3CH(CH_3)(CH_2CH_3)$, —$(Ch_2)_2CH(CH_3)((CH_2)_2CH_3)$, —$CH_2CH(CH_3)$ $((CH_2)_3CH_3)$, —$CH(CH_3)((CH_2)_4CH_3)$, —$(CH_2)_3C(CH_3)_3$, —$(CH_2)_2C(CH_3)_2(CH_2CH_3)$, —$CH_2C(CH_3)_2((CH_2)_2CH_3)$, —$C(CH_3)_2((CH_2)_3CH_3)$, —$(CH_2)_2C(CH_3)(C(CH_3)_2)$, —$CH_2CH(CH_3)(CH_2CH(CH_3)_2)$, —$CH(CH_3)((CH_2)_2CH$ $(CH_3)_2)$, —$CH_2CH(CH_3)(CH(CH_3)(CH_2CH_3))$, —CH $(CH_3)(CH_2CH(CH_3)(CH_2CH_3))$, —$CH(CH_3)(CH(CH_3)$ $((CH_2)_2CH_3))$, —$CH(CH_3(CH(CH_3)(CH(CH_3)_2)))$, —$C(CH_3)_2CH(CH_3)(CH_2CH_3)$, —$CH(CH_3)(C(CH_3)_2$ $(CH_2CH_3))$, —$CH_2C(CH_3)_2(CH(CH_3)_2)$, —$CH(CH_3)$ $(CH_2C(CH_3)_3)$, —$CH(CH_3)(C(CH_3)_3)$, —$C(CH_3)_2$ $(CH_2CH(CH_3)_2)$, —$CH(CH_3)((CH_2)_4CH_3))$, —$CH(CH_3)$ $((CH_2)_2CH(CH_3)_2)$, —$CH(CH_3)(CH_2CH(CH_3)(CH_2CH_3)$, —$CH(CH_3)(CH(CH_3)((CH_2)_2CH_3)$, —$CH(CH_3)(CH(CH_3)$ $CH(CH_3)_2)$, —$CH(CH_3)(CH_2C(CH_3)_3)$, —$CH(CH_3)(C$ $(CH_3)_2(CH_2CH_3))$, —$CH(CH_2CH_3)((CH_2)_3CH_3)$, —CH $(CH_2CH_3)(CH_2(H(CH_3)_2))$, —$CH(CH_2CH_3)(CH(CH_3)$ $(CH_2CH_3))$, —$CH(CH_2CH_3)(C(CH_3)_3))$, —$CH((CH_2)_2CH_3)_2$, —$CH(CH(CH_3)_2)_2$, —$CH((CH_2)_2CH_3)(CH(CH_3)_2)$, n-octyl (—$(CH_2)_7CH_3)$, —$(CH_2)_5CH(CH_3)_2$, —$(CH_2)_4CH(CH_3(CH_2CH_3))$, —$(CH_2)_3CH(CH_3)((CH_2)_2CH_3)$, —$(CH_2)_2CH(CH_3)$ $((CH_2)_3CH_3)$, —$CH_2CH(CH_3)((CH_2)_4CH_3))$, —$CH(CH_3)$ $((CH_2)_5CH_3)$, —$(CH_2)_3CH(CH_3)(CH(CH_3)_2)$, —$(CH_2)_2CH$ $(CH_3)CH_2CH(CH_3)_2)$, —$CH(CH_3)(CH_2CH_2CH$ $(CH_3)_2)$, —$CH(CH_3)((CH_2)_3CH(CH_3)_2)$, —$(CH_2)_2CH$ $(CH_3)(CH(CH_3)(CH_2CH_3))$, —$CH_2CH(CH_3)(CH_2CH$ $(CH_3)(CH_2CH_3))$, —$CH(CH_3)((CH_2)_2CH(CH_3)$ $(CH_2CH_3))$, —$CH_2CH(CH_3)(CH(CH_3)((CH_2)_2CH_3))$, —$CH(CH_3)(CH_2CH(CH_3)(CH_2CH_2CH_3))$, —$CH(CH_3)$ $(CH(CH_3)((CH_2)_3CH_3))$, —$(CH_2)_4C(CH_3)_3$, —$(CH_2)_3C$ $(CH_3)_2(CH_2CH_3)$, —$(CH_2)_2C(CH_3)_2((CH_2)_2CH_3)$, —$CH_2C$ $(CH_3)_2((CH_2)_3CH_3)$, —$C(CH_3)_2((CH_2)_4CH_3)$, —$CH_2CH$ $(CH_3)(CH(CH_3)(CH(CH_3)_2))$, —$CH(CH_3)(CH_2CH(CH_3)$ $(CH(CH_3)_2))$, —$CH(CH_3)(CH(CH_3)(CH_2CH(CH_3)_2))$, —$CH(CH_3)(CH(CH_3)(CH(CH_3)(CH_2CH_3))$, —$C(CH_3)_2$ $(CH(CH_3)((CH_2)_2CH_3))$, —$C(CH_3)_2(CH_2CH(CH_3)$ $(CH_2CH_3))$, —$C(CH_3)_2(CH_2CH_2CH(CH_3)_2)$, —$CH(CH_3)$ $(C(CH_3)_2(CH_2CH_2CH_3))$, —$CH_2C(CH_3)_2(CH(CH_3)$ $(CH_2CH_3))$, —$CH_2C(CH_3)_2(CH_2CH(CH_3)_2)$, —$CH(CH_3)$ $(CH_2C(CH_3)_2(CH_2CH_3))$, —$CH_2CH(CH_3)(C(CH_3)_2$ $(CH_2CH_3))$, —$(CH_2)_2C(CH_3)_2(CH(CH_3)_2))$, —$(CH_2)_2CH$ $(CH_3)(C(CH_3)_3)$, —$CH_2CH(CH_3)(CH_2C(CH_3)_3)$, —CH $(CH_3)((CH_2)_2C(CH_3)_3)$, —$C(CH_3)_2(C(CH_3)_2(CH_2CH_3))$, —$C(CH_3)_2(CH_2C(CH_3)_3)$, —$CH_2C(CH_3)_2(C(CH_3)_3)$, —CH(CH₃)(C(CH₃)₂(CH(CH₃)₂)), —C(CH₃)₂(CH(CH₃)(CH(CH₃)₂)), —C(CH₃)₂(CH(CH₃)(C(CH₃)₃)), —CH(CH₃)((CH₂)₅CH₃), —CH(CH₃)((CH₂)₃CH(CH₃)₂), —CH(CH₃)((CH₂)₂CH(CH₃)(CH₂CH₃)), —CH(CH₃)(CH₂CH(CH₃)(CH₂CH₂CH₃)), —CH(CH₃)(CH(CH₃)((CH₂)₃CH₃)), —CH(CH₃)(C(CH₃)₂(CH(CH₃)₂)), —CH(CH₃)(C(CH₃)₂((CH₂)₂CH₃)), —CH(CH₃)(CH₂C(CH₃)₂(CH₂CH₃)), —CH(CH₃)((CH₂)₂C(CH₃)₃), —CH(CH₃)(CH(CH₃)(CH(CH₃)(CH₂CH₃))), —CH(CH₃)(CH(CH₃)(CH₂CH(CH₃)₂)), —CH(CH₃)(CH₂CH(CH₃)(CH(CH₃)₂)), —CH(CH₃)(CH(CH₃)(C(CH₃)₃)), —CH(CH₂CH₃)((CH₂)₄CH₃), —CH(CH₂CH₃)(CH₂CH₂CH(CH₃)₂), —CH(CH₂CH₃)(CH₂CH(CH₃)(CH₂CH₃)), —CH(CH₂CH₃)(CH(CH₃)(CH₂CH₂CH₃)), —CH(CH₂CH₃)(CH₂C(CH₃)₃), —CH(CH₂CH₃)(C(CH₃)₂(CH₂CH₃)), —CH(CH₂CH₃)(CH(CH₃)(CH(CH₃)₂)), —CH(CH₂CH₂CH₃)((CH₂)₃CH₃), —CH(CH₂CH₂CH₃)(CH₂CH(CH₃)₂), —CH(CH₂CH₂CH₃)(CH(CH₃)(CH₂CH₃)), —CH(CH₂CH₂CH₃)(C(CH₃)₃), —CH(CH(CH₃)₂)((CH₂)₃CH₃), —CH(CH(CH₃)₂)(CH₂CH(CH₃)₂), —CH(CH(CH₃)₂)(CH(CH₃)(CH₂CH₃)), —CH(CH(CH₃)₂)(C(CH₃)₃).

The C1-8 alkoxy group may be e.g. methoxy, ethoxy, n-propoxy, i-propoxy, n-butoxy, i-butoxy, t-butoxy, n-pentoxy, i-pentoxy (—OCH(CH₃)(CH₂CH₂CH₃)), —OCH(CH₃)(CH(CH₃)₂), tert-pentoxy (—OCH(CH₃)₂(CH₂CH₃), neo-pentoxy (—OCH₂C(CH₃)₃), a C6 alkoxy group, such as —O(CH₂)₅CH₃, —O(CH₂)₃CH(CH₃)₂, —O(CH₂)₂CH(CH₃)(CH₂CH₃), —OCH₂CH(CH₃)(CH₂CH₂CH₃), —OCH(CH₃)((CH₂)₃CH₃), —OCH₂CH(CH₃)(CH(CH₃)₂), —OCH(CH₃)(CH₂CH(CH₃)₂), —OCH(CH₃)(CH(CH₃)(CH₂CH₃)), —OCH(CH₃)((CH₂)₃CH₃), —OCH(CH₃)(CH₂CH(CH₃)₂), —OCH(CH₃)(CH(CH₃)(CH₂CH₃)), —OCH(CH₃)(CH₂CH₃)₂, —OCH(CH₂CH₃)((CH₂)₂CH₃), —OCH(CH₂CH₃)(CH(CH₃)₂), a C7 alkoxy group, such as —O(CH₂)₆CH₃, —O(CH₂)₄CH(CH₃)₂, —O(CH₂)₃CH(CH₃)(CH₂CH₃), —O(CH₂)₂CH(CH₃)((CH₂)₂CH₃), —OCH₂CH(CH₃)((CH₂)₃CH₃), —OCH(CH₃)((CH₂)₄CH₃), —O(CH₂)₃C(CH₃)₃, —O(CH₂)₂C(CH₃)₂(CH₂CH₃), —OCH₂C(CH₃)₂((CH₂)₂CH₃), —OC(CH₃)₂((CH₂)₃CH₃), —O(CH₂)₂C(CH₃)(C(CH₃)₂), —OCH₂CH(CH₃)(CH₂CH(CH₃)₂), —OCH(CH₃)((CH₂)₂CH(CH₃)₂), —OCH₂CH(CH₃)(CH(CH₃)(CH₂CH₃)), —OCH(CH₃)(CH₂CH(CH₃)(CH₂CH₃)), —OCH(CH₃)(CH(CH₃)((CH₂)₂CH₃)), —OCH₂CH(CH₃(CH(CH₃)(CH(CH₃)₂))), —OC(CH₃)₂CH(CH₃)(CH₂CH₃), —OCH(CH₃)(C(CH₃)₂(CH₂CH₃)), —OCH₂C(CH₃)₂(CH(CH₃)₂), —OCH₂C(CH₃)₃(CH(CH₃)₃), —OC(CH₃)₂(CH₂CH(CH₃)₂), —OCH(CH₃)((CH₂)₄CH₃)), —OCH(CH₃)((CH₂)₂CH(CH₃)₂), —OCH(CH₃)(CH₂CH(CH₃)(CH₂CH₃), —OCH(CH₃)(CH(CH₃)((CH₂)₂CH₃), —OCH(CH₃)(CH(CH₃)CH(CH₃)₂), —OCH(CH₃)(CH₂C(CH₃)₃), —OCH(CH₃)(C(CH₃)₂(CH₂CH₃)), —OCH(CH₂CH₃)((CH₂)₃CH₃), —OCH(CH₂CH₃)(CH₂(H(CH₃)₂)), —OCH(CH₂CH₃)(CH(CH₃)(CH₂CH₃)), —OCH(CH₂CH₃)(C(CH₃)₃)), —OCH((CH₂)₂CH₃)₂, —OCH(CH(CH₃)₂)₂, —OCH((CH₂)₂CH₃)(CH(CH₃)₂), a C8 alkoxy group such as —O(CH₂)₇CH₃, —O(CH₂)₅CH(CH₃)₂, —O(CH₂)₄CH(CH₃)(CH₂CH₃)), —O(CH₂)₃CH(CH₃)((CH₂)₂CH₃), —O(CH₂)₂CH(CH₃)((CH₂)₃CH₃), —OCH₂CH(CH₃)((CH₂)₄CH₃), —OCH(CH₃)((CH₂)₅CH₃), —O(CH₂)₃CH(CH₃)(CH(CH₃)₂), —O(CH₂)₂CH(CH₃)(CH₂CH(CH₃)₂), —OCH₂CH(CH₃)(CH₂CH₂CH(CH₃)₂, —OCH(CH₃)((CH₂)₃CH(CH₃)₂), —O(CH₂)₂CH(CH₃)(CH(CH₃)(CH₂CH₃)), —OCH₂CH(CH₃)(CH₂CH(CH₃)(CH₂CH₃)), —OCH(CH₃)((CH₂)₂CH(CH₃)(CH₂CH₃)), —OCH₂CH(CH₃)(CH(CH₃)((CH₂)₂CH₃)), —OCH(CH₃)(CH(CH₃)(CH(CH₃)(CH(CH₃)(CH₂CH₃))), —OCH(CH₃)(CH(CH₃)  ((CH₂)₃CH₃)), —O(CH₂)₄C(CH₃)₃, —O(CH₂)₃C(CH₃)₂(CH₂CH₃), —O(CH₂)₂C(CH₃)₂((CH₂)₂CH₃), —OCH₂C(CH₃)₂((CH₂)₃CH₃), —OC(CH₃)₂((CH₂)₄CH₃), —OCH₂CH(CH₃)(CH(CH₃)(CH(CH₃)₂)), —OCH(CH₃)(CH₂CH(CH₃)(CH(CH₃)₂)), —OCH(CH₃)(CH(CH₃)(CH₂CH(CH₃)₂)), —OCH(CH₃)(CH(CH₃)(CH(CH₃)(CH₂CH₃))), —OC(CH₃)₂(CH(CH₃)((CH₂)₂CH₃)), —OC(CH₃)₂(CH₂CH(CH₃)(CH₂CH₃)), —OC(CH₃)₂(CH₂CH₂CH(CH₃)₂), —OCH(CH₃)(C(CH₃)₂(CH₂CH₂CH₃)), —OCH₂C(CH₃)₂(CH(CH₃)(CH₂CH₃)), —OCH₂C(CH₃)₂(CH₂CH(CH₃)₂), —OCH(CH₃)(CH₂C(CH₃)₂(CH₂CH₃)), —OCH₂CH(CH₃)(C(CH₃)₂(CH₂CH₃)), —O(CH₂)₂(C(CH₃)₂(CH(CH₃)₂)), —O(CH₂)₂CH(CH₃)(C(CH₃)₃), —OCH₂CH(CH₃)(CH₂C(CH₃)₃), —OCH(CH₃)((CH₂)₂C(CH₃)₂CH₃), —OC(CH₃)₂(C(CH₃)₂(CH₂CH₃)), —OC(CH₃)₂(CH₂C(CH₃)₃), —OCH₂C(CH₃)₂(C(CH₃)₃), —OCH(CH₃)(C(CH₃)₂(CH(CH₃)₂)), —OC(CH₃)₂(CH(CH₃)(CH(CH₃)₂)), —OC(CH₃)₂(CH(CH₃)(C(CH₃)₃)), —OCH(CH₃)((CH₂)₅CH₃), —OCH(CH₃)((CH₂)₃CH(CH₃)₂), —OCH(CH₃)((CH₂)₂CH(CH₃)(CH₂CH₃)), —OCH(CH₃)(CH₂CH(CH₃)(CH₂CH₂CH₃)), —OCH(CH₃)(CH(CH₃)((CH₂)₃CH₃)), —OCH(CH₃)(C(CH₃)₂(CH(CH₃)₂)), —OCH(CH₃)(C(CH₃)₂((CH₂)₂CH₃)), —OCH(CH₃)(CH₂C(CH₃)₂(CH₂CH₃)), —OCH(CH₃)((CH₂)₂C(CH₃)₃), —OCH(CH₃)(CH(CH₃)(CH(CH₃)(CH₂CH₃))), —OCH(CH₃)(CH(CH₃)(CH₂CH(CH₃)₂)), —OCH(CH₃)(CH₂CH(CH₃)(CH(CH₃)₂)), —OCH(CH₃)(CH(CH₃)(C(CH₃)₃)), —OCH(CH₂CH₃)((CH₂)₄CH₃), —OCH(CH₂CH₃)(CH₂CH₂CH(CH₃)₂), —OCH(CH₂CH₃)(CH₂CH(CH₃)(CH₂CH₃)), —OCH(CH₂CH₃)(CH(CH₃)(CH₂CH₂CH₃)), —OCH(CH₂CH₃)(CH₂C(CH₃)₃), —OCH(CH₂CH₃)(C(CH₃)₂(CH₂CH₃)), —OCH(CH₂CH₃)(CH(CH₃)(CH(CH₃)₂)), —OCH(CH₂CH₂CH₃)((CH₂)₃CH₃), —OCH(CH₂CH₂CH₃)(CH₂CH(CH₃)₂), —OCH(CH₂CH₂CH₃)(CH(CH₃)(CH₂CH₃)), —OCH(CH₂CH₂CH₃)(C(CH₃)₃), —OCH(CH(CH₃)₂)((CH₂)₃CH₃), —OCH(CH(CH₃)₂)(CH₂CH(CH₃)₂), —OCH(CH(CH₃)₂)(CH(CH₃)(CH₂CH₃)), —OCH(CH(CH₃)₂)(C(CH₃)₃). R₁ and R₁' may be the same or different.

n And m are integers and may be the same or different and may be equal to 0, 1, 2 or 3. The di-ester compound may be obtained by condensation of two equivalents of a monocarboxylic acid and one equivalent of a di-hydroxyl component (component comprising two hydroxyl functional groups). Alternatively, the di-ester compound may be obtained by condensation of two equivalents of a mono-hydroxyl component (component comprising one hydroxyl functional group) and one equivalent of a dicarboxylic acid.

In the embodiment, the hot melt ink composition may further comprise a crystallization retardant, wherein the crystallization retardant is a compound according to Formula 4 wherein R₃ is selected from a C1-8 alkyl or a C1-8 alkoxy group, R₄ is a C1-12 linear or branched alkyl and n' is equal to 0, 1, 2 or 3. Preferably, n' is equal to 1, 2 or 3. The crystallization retardant may be a mono-ester derivative of the di-ester crystalline material and may be an aromatic mono-ester. Herein, a mono-ester derivative of the crystalline material may be a mono-ester component having a molecular structure resembling the molecular structure of the crystalline material. The mono-ester derivative may be a condensation product of a mono-carboxylic acid component and a mono-hydroxyl component. Preferably, the mono-ester derivative does not have free hydroxyl functional groups or free carboxylic acid groups. Free hydroxyl functional groups or free carboxylic acid groups may react with another component in the hot melt ink composition, thereby leading to degradation of the hot melt ink composition. The hot melt ink composition may be jetted at elevated temperature. Especially at elevated temperatures, where reaction rates are generally higher, free functional hydroxyl groups or free carboxylic acid groups may lead to degradation of the ink.

$R_3$ may be selected from C1-8 alkyl or a C1-8 alkoxy group. $R_3$ may be selected from the same group of alkyl and alkoxy group as the groups mentioned above with regard to $R_1$ and $R_2$. n' May be equal to 1, 2 or 3.

$R_4$ may be selected from a C1-12 linear or branched alkyl. Examples of linear C1-12 alkyl groups are methyl, ethyl, n-propyl, n-butyl, n-pentyl, n-hexyl, n-heptyl, n-octyl, n-nonyl, n-decyl, n-undecyl and n-dodecyl.

Examples of branched C1-12 alkyl groups are i-propyl, i-butyl, tert-butyl, , —CH(CH$_3$)(CH(CH$_3$)$_2$), tert-pentyl (—CH(CH$_3$)$_2$(CH$_2$CH$_3$), neo-pentyl (—CH$_2$C(CH$_3$)$_3$), —(CH$_2$)$_3$CH(CH$_3$)$_2$, —(CH$_2$)$_2$CH(CH$_3$)(CH$_2$CH$_3$), —CH$_2$CH(CH$_3$)(CH$_2$CH$_2$CH$_3$), —CH(CH$_3$)((CH$_2$)$_3$CH$_3$), —CH$_2$CH(CH$_3$)(CH(CH$_3$)$_2$), —CH(CH$_3$)(CH$_2$CH(CH$_3$)$_2$), —CH(CH$_3$)(CH(CH$_3$)(CH$_2$CH$_3$)), —CH(CH$_3$)((CH$_2$)$_3$CH$_3$), —CH(CH$_3$)(CH$_2$CH(CH$_3$)$_2$), —CH(CH$_3$)(CH(CH$_3$)(CH$_2$CH$_3$)), —CH(CH$_3$)(CH$_2$CH$_3$)$_2$, —CH(CH$_2$CH$_3$)((CH$_2$)$_2$CH$_3$), —CH(CH$_2$CH$_3$)(CH(CH$_3$)$_2$), —(CH$_2$)$_4$CH(CH$_3$)$_2$, —(CH$_2$)$_3$CH(CH$_3$)(CH$_2$CH$_3$), —(CH$_2$)$_2$CH(CH$_3$)((CH$_2$)$_2$CH$_3$), —CH$_2$CH(CH$_3$)((CH$_2$)$_3$CH$_3$), —CH(CH$_3$)((CH$_2$)$_4$CH$_3$), —(CH$_2$)$_3$C(CH$_3$)$_3$, —(CH$_2$)$_2$C(CH$_3$)$_2$(CH$_2$CH$_3$), —CH$_2$C(CH$_3$)$_2$((CH$_2$)$_2$CH$_3$), —C(CH$_3$)$_2$((CH$_2$)$_3$CH$_3$), —(CH$_2$)$_2$C(CH$_3$)(C(CH$_3$)$_2$), —CH$_2$CH(CH$_3$)(CH$_2$CH(CH$_3$)$_2$), —CH(CH$_3$)((CH$_2$)$_2$CH(CH$_3$)$_2$), —CH$_2$CH(CH$_3$)(CH(CH$_3$)(CH$_2$CH$_3$)), —CH(CH$_3$)(CH$_2$CH(CH$_3$)(CH$_2$CH$_3$)), —CH(CH$_3$)(CH(CH$_3$)((CH$_2$)$_2$CH$_3$)), —CH(CH$_3$(CH(CH$_3$)(CH(CH$_3$)$_2$))), —C(CH$_3$)$_2$CH(CH$_3$)(CH$_2$CH$_3$), —CH(CH$_3$)(C(CH$_3$)$_2$(CH$_2$CH$_3$)), —CH$_2$C(CH$_3$)$_2$(CH(CH$_3$)$_2$), —CH(CH$_3$)(CH$_2$C(CH$_3$)$_3$), —CH$_2$CH(CH$_3$)(C(CH$_3$)$_3$), —C(CH$_3$)$_2$(CH$_2$CH(CH$_3$)$_2$), —CH(CH$_3$)((CH$_2$)$_4$CH$_3$)), —CH(CH$_3$)(CH$_2$CH(CH$_3$)(CH$_2$CH$_3$)), —CH(CH$_3$)(CH(CH$_3$)((CH$_2$)$_2$CH$_3$)), —CH(CH$_3$)(CH(CH$_3$) CH(CH$_3$)$_2$), —CH(CH$_3$)(CH$_2$C(CH$_3$)$_3$), —CH(CH$_3$)(C (CH$_3$)$_2$(CH$_2$CH$_3$)), —CH(CH$_2$CH$_3$)((CH$_2$)$_3$CH$_3$), —CH (CH$_2$CH$_3$)(CH$_2$(H(CH$_3$)$_2$)), —CH(CH$_2$CH$_3$)(CH(CH$_3$) (CH$_2$CH$_3$)), —CH(CH$_2$CH$_3$)(C(CH$_3$)$_3$)), —CH ((CH$_2$)$_2$CH$_3$)$_2$, —CH(CH(CH$_3$)$_2$)$_2$, —CH(((CH$_2$)$_2$CH$_3$)(CH (CH$_3$)$_2$), —(CH$_2$)$_5$CH(CH$_3$)$_2$, —(CH$_2$)$_4$CH(CH$_3$ CH$_2$CH$_3$)), —(CH$_2$)$_3$CH(CH$_3$)((CH$_2$)$_2$CH$_3$), —(CH$_2$)$_2$CH (CH$_3$)((CH$_2$)$_3$CH$_3$), —CH$_2$CH(CH$_3$)((CH$_2$)$_4$CH$_3$), —CH (CH$_3$)((CH$_2$)$_5$CH$_3$), —(CH$_2$)$_3$CH(CH$_3$)(CH(CH$_3$)$_2$), —(CH$_2$)$_2$CH(CH$_3$)(CH$_2$CH(CH$_3$)$_2$), —CH$_2$CH(CH$_3$) (CH$_2$CH$_2$CH(CH$_3$)$_2$, —CH(CH$_3$)((CH$_2$)$_3$CH(CH$_3$)$_2$), —(CH$_2$)$_2$CH(CH$_3$)(CH(CH$_3$)(CH$_2$CH$_3$)), —CH$_2$CH(CH$_3$) (CH$_2$CH(CH$_3$)(CH$_2$CH$_3$)), —CH(CH$_3$)((CH$_2$)$_2$CH(CH$_3$) (CH$_2$CH$_3$)), —CH$_2$CH(CH$_3$)(CH(CH$_3$)((CH$_2$)$_2$CH$_3$)), —CH(CH$_3$)(CH$_2$CH(CH$_3$)(CH$_2$CH$_2$CH$_3$)), —CH(CH$_3$) (CH(CH$_3$)((CH$_2$)$_3$CH$_3$)), —(CH$_2$)$_4$C(CH$_3$)$_3$, —(CH$_2$)$_3$C (CH$_3$)$_2$(CH$_2$CH$_3$), —(CH$_2$)$_2$C(CH$_3$)$_2$((CH$_2$)$_2$CH$_3$), —CH$_2$C (CH$_3$)$_2$((CH$_2$)$_3$CH$_3$), —C(CH$_3$)$_2$((CH$_2$)$_4$CH$_3$), —CH$_2$CH (CH$_3$)(CH(CH$_3$)(CH(CH$_3$)$_2$)), —CH(CH$_3$)(CH$_2$CH(CH$_3$) (CH(CH$_3$)$_2$)), —CH(CH$_3$)(CH(CH$_3$)(CH$_2$CH(CH$_3$)$_2$)), —CH(CH$_3$)(CH(CH$_3$)(CH(CH$_3$)(CH$_2$CH$_3$))), —C(CH$_3$)$_2$ (CH(CH$_3$)((CH$_2$)$_2$CH$_3$)), —C(CH$_3$)$_2$(CH$_2$CH(CH$_3$) (CH$_2$CH$_3$)), —C(CH$_3$)$_2$(CH$_2$CH$_2$CH(CH$_3$)$_2$), —CH(CH$_3$) (C(CH$_3$)$_2$(CH$_2$CH$_2$CH$_3$)), —CH$_2$C(CH$_3$)$_2$(CH(CH$_3$)$_2$), —CH(CH$_3$)(CH(CH$_3$)(C(CH$_3$)$_3$)), —CH(CH$_3$)((CH$_2$)$_2$C (CH$_3$)$_3$), —C(CH$_3$)$_2$(C(CH$_3$)$_2$(CH$_2$CH$_3$)), —C(CH$_3$)$_2$(CH$_2$C(CH$_3$)$_3$), —CH$_2$C(CH$_3$)$_2$(C(CH$_3$)$_3$), —CH(CH$_3$)(C(CH$_3$)$_2$(CH(CH$_3$)$_2$)), —C(CH$_3$)$_2$(CH(CH$_3$) (CH(CH$_3$)$_2$)), —C(CH$_3$)$_2$(CH(CH$_3$)(C(CH$_3$)$_3$)), —CH (CH$_3$)((CH$_2$)$_5$CH$_3$), —CH(CH$_3$)((CH$_2$)$_3$CH(CH$_3$)$_2$), —CH (CH$_3$)((CH$_2$)$_2$CH(CH$_3$)(CH$_2$CH$_3$)), —CH(CH$_3$)(CH$_2$CH (CH$_3$)(CH$_2$CH$_2$CH$_3$)), —CH(CH$_3$)(CH(CH$_3$) ((CH$_2$)$_3$CH$_3$)), —CH(CH$_3$)(C(CH$_3$)$_2$(CH(CH$_3$)$_2$)), —CH (CH$_3$)(C(CH$_3$)$_2$((CH$_2$)$_2$CH$_3$)), —CH(CH$_3$)(CH$_2$C(CH$_3$)$_2$ (CH$_2$CH$_3$)), —CH(CH$_3$)((CH$_2$)$_2$C(CH$_3$)$_3$), —CH(CH$_3$)(CH (CH$_3$)(CH(CH$_3$)(CH$_2$CH$_3$))), —CH(CH$_3$)(CH(CH$_3$) (CH$_2$CH(CH$_3$)$_2$)), –CH(CH$_3$)(CH$_2$CH(CH$_3$)(CH(CH$_3$)$_2$)), CH(CH$_3$)(CH(CH$_3$)(C(CH$_3$)$_3$)), —CH(CH$_2$CH$_3$) ((CH$_2$)$_4$CH$_3$), —CH(CH$_2$CH$_3$)(CH$_2$CH$_2$CH(CH$_3$)$_2$), —CH (CH$_2$CH$_3$)(CH$_2$CH(CH$_3$)(CH$_2$CH$_3$)), —CH(CH$_2$CH$_3$)(CH (CH$_3$)(CH$_2$CH$_2$CH$_3$)), —CH(CH$_2$CH$_3$)(CH$_2$C(CH$_3$)$_3$), —CH(CH$_2$CH$_3$)(C(CH$_3$)$_2$(CH$_2$CH$_3$)), —CH(CH$_2$CH$_3$)(CH (CH$_3$)(CH(CH$_3$)$_2$)), —CH(CH$_2$CH$_2$CH$_3$)((CH$_2$)$_3$CH$_3$), —CH(CH$_2$CH$_2$CH$_3$)(CH$_2$CH(CH$_3$)$_2$), —CH(CH$_2$CH$_2$CH$_3$) (CH(CH$_3$)(CH$_2$CH$_3$)), —CH(CH$_2$CH$_2$CH$_3$)(C(CH$_3$)$_3$), —CH(CH(CH$_3$)$_2$)((CH$_2$)$_3$CH$_3$), —CH(CH(CH$_3$)$_2$)(CH$_2$CH (CH$_3$)$_2$), —CH(CH(CH$_3$)$_2$)(CH(CH$_3$)(CH$_2$CH$_3$)) , —CH (CH(CH$_3$)$_2$)(C(CH$_3$)$_3$), —CH(CH$_2$CH(CH$_3$)$_2$)$_2$, —CH (CH$_3$)((CH$_2$)$_7$CH$_3$), —CH(CH$_2$CH$_3$)((CH$_2$)$_6$CH$_3$), —C(CH$_3$)(C$_2$H$_5$)((CH))$_3$CH(CH$_3$)$_2$), —CH$_2$CH$_2$CH(CH$_3$) ((CH$_2$)$_3$(CH(CH$_3$)$_2$)), —CH(C(CH$_3$)$_3$)((CH$_2$)$_4$CH$_3$), —C(CH$_3$)(CH$_2$CH$_3$)(CH(CH$_3$)(CH(CH$_3$)$_2$)), —CH(CH (CH$_3$)$_2$)((CH$_2$)$_5$CH$_3$), —CH(CH$_2$CH(CH$_3$)$_2$)((CH$_2$)$_4$CH$_3$), —C(CH$_3$)(CH(CH$_3$)(CH$_2$CH$_3$))$_2$, —C(CH$_3$)((CH$_2$)$_3$CH$_3$)$_2$, —CH(CH$_3$)((CH$_2$)$_8$CH$_3$), —CH(C(CH$_3$)$_2$(CH$_2$CH$_3$))$_2$, —CH(CH$_3$)((CH$_2$)$_9$CH$_3$).

The molecular structure of the aromatic mono-ester (the crystallization retardant) may resemble the molecular structure of the mono-ester derivative of the diester crystalline component. However, the mono-ester derivative of the diester crystalline component may comprise an unreacted alcohol or carboxylic acid group. This unreacted functional group may show reactivity towards other components of the hot melt ink composition, or towards the print head when the ink is in the print head. Especially at higher temperatures, the unreacted alcohol or carboxylic acid groups may show reactivity. For example, they may degrade other components of the hot melt ink composition, such as esters or amides. For example, these esters or amides may be hydrolyzed in the presence of water, leading to degrading of the ink composition. Because hot melt ink compositions may be jetted at high temperatures, the hot melt ink compositions may be generally stored in an ink reservoir at elevated temperature, to allow the ink to be jetted. Thus, it is preferred not to have mono-ester derivative of the diester crystalline component comprising unreacted functional groups, such as a hydroxyl group or carboxylic acid group.

In an embodiment, $R_3$ is an alkoxysubstituent that is positioned on the ortho- and/or the para-position of the aromatic ring. Without wanting to be bound to any theory, it is believed that an alkoxygroup that is positioned on the ortho- and/or para-position on the ring has an electron donating effect on the aromatic ring, thereby rendering the aromatic ring more electron-rich. An ester group, bonded to an electron-rich aromatic ring, is more difficult to hydrolyze than an ester group bonded to a less electron-rich aromatic ring. Therefore, it is advantageous to provide the ortho- and/or the meta-position of the aromatic ring with an alkoxy substituent. Hot melt ink compositions are jetted at an elevated temperature. When the ink composition is kept at the elevated temperature, degradation processes of the ink components, such as ester-hydrolysis, may occur at a higher rate than at room temperature. Therefore, it is advantageous to have hot melt ink composition components that are stable, also at elevated temperatures.

In an embodiment, $R_4$ is a linear alkyl substituent. When $R_4$ is a linear alkyl group, the tendency of the crystallization retardant to crystallize may be higher than if the $R_4$ substituent is a branched alkyl group.

The crystallization retardant may have a viscosity in the range of 3 mPa s to 12 mPa s at 140° C. when measured according to DIN 53018. The viscosity of the aromatic mono-ester may be lower than the viscosity of the crystalline material. Thus, the viscosity of a hot melt ink composition comprising the crystalline material may be lowered by replacing a part of the crystalline material by the aromatic mono-ester. The viscosity of the hot melt ink composition may preferably not too high, because it may be difficult, or even impossible, to jet a highly viscous ink. For example, the viscosity of the hot melt ink composition may be lower than 30 mPa.s, measured at a temperature of 140°. The viscosity of the hot melt ink composition may preferably be from 3 mPa.s to 20 mPa.s, measured at a temperature of 140°, such as from 5 mPa.s to 15 mPa.s, measured at a temperature of 140°. Therefore, it is advantageous to add viscosity-lowering components, because then the ink composition may be jetted more easily.

The molecular structure of the crystallization retardant may resemble the molecular structure of the crystalline material. As a consequence, the nature of the hot melt ink composition may not change much by replacing a part of the crystalline material by the crystallization retardant resembling the crystalline material.

Table 1 shows some examples of combinations of crystalline materials and crystallization retardants resembling the crystalline material.

TABLE 1 combinations of crystalline materials (CM) and crystallization retardants (CR) resembling the crystalline material.

Combi. 1  CM  3

CR  20 n = 0, 1, 2, 3, 4, 5

Combi. 2  CM  4

CR  21 n = 0, 1, 2, 3, 4, 5

Combi. 3  CM  5

TABLE 1-continued combinations of crystalline materials (CM) and crystallization retardants (CR) resembling the crystalline material.

| | CR | 22 |  | n = 0, 1, 2, 3, 4, 5

| Combi. 4 | CM | 6 |  | n = 4-9

| | CR | 23 |  | n = 1-9

| Combi. 5 | CM | 7 |  | n = 6-16

| | CR | 24 |  | n = 6-16

| Combi. 6 | CM | 8 |  | n = 2-4

| | CR | 25 |  | n = 1, 2, 3, 4

| Combi. 7 | CM | 9 |  |

TABLE 1-continued combinations of crystalline materials (CM) and crystallization retardants (CR) resembling the crystalline material.

| | | |
|---|---|---|
| | CR 26 | <br>n = 2-6 |
| Combi. 8 | CM 10 | <br>n = 1-6 |
| | CR 27 | <br>n = 1-6 |
| Combi. 9 | CM 11 | <br>n = 3-6 |
| | CR 28 | <br>n = 3-6 |
| Combi. 10 | CM 12 | <br>n = 3-6 |
| | CR 29 | <br>n = 3-6 |
| Combi. 11 | CM 13 | <br>n = 2, 4, 6, 8, 10 |
| | CR 30 | <br>n = 0, 2, 4, 6, 8, 10 |

TABLE 1-continued combinations of crystalline materials (CM) and crystallization retardants (CR) resembling the crystalline material.

Combi. 12  CM  14 n = 2, 4, 6, 8, 10

CR  31 n = 0, 2, 4, 6, 8, 10

Combi. 13  CM  15

CR  32 n = 0, 1, 2, 3, 4, 5

Combi. 14  CM  16

CR  33 n = 0, 1, 2, 3, 4, 5

In an embodiment, the hot melt ink composition further comprises a nucleating agent. As mentioned above, the crystalline material may form crystals upon cooling of the hot melt ink composition. Typically, a crystallization process may comprise two stages; nucleation and crystal growth. In a first step, the nucleation, crystal nuclei are formed. In a second step, crystal growth may occur; crystals may grow from a crystal nucleus after the nucleus has been formed. The crystalline material itself may form nuclei upon cooling down. However, depending on the conditions, such as temperature, the time needed to form nuclei and the amount of nuclei formed may vary. The more nuclei are formed, the more crystal that may grow, such that small crystals may be present in the image on the receiving medium after crystallization has taken place. However, when only little nuclei have been formed, large crystals may form on the receiving medium. This number and the size of crystals formed may influence the print robustness and the appearance of the printed image. However, it may be difficult to suitably control the formation of crystal nuclei from the crystalline material.

By addition of a nucleating agent, the nuclei, needed to grow crystals may be provided by the particles of the nucleating agent. Therefore, the nuclei may not need to be formed by the crystalline material itself. By the addition of a predetermined amount of nucleating agent, the number of crystal nuclei may be efficiently controlled. By controlling the amount of nucleating agent with respect to the amount of crystalline material, the number of crystals formed and the size of the crystals of the crystalline material may be efficiently controlled, thereby efficiently controlling the print robustness and the appearance of the printed image. The nucleating agent may be a crystalline material having a crystallization point higher than the crystallization point of the crystalline material. Preferably, the crystallization point of the nucleating agent is 20° C.-40° C. higher than the crystallization point of the crystalline material. More preferably, the crystallization point of the nucleating agent is 25° C.-30° C. higher than the crystallization point of the crystalline material. The molecular structure of the crystalline material may be such that a crystal of the crystalline material may grow starting from the nucleus comprising the nucleating agent.

The nucleating agent may be selected from di-ester or di-amide compounds, said di-ester or di-amides having a linear alkyl group having 1-15 C-atoms, that bridge the ester functional groups or the amide functional group, resp.

The hot melt ink composition may further comprise a gelling agent. When the droplets of hot melt ink are printed onto a receiving medium, the droplets may still be fluid. When the droplets are in a fluid state, they may flow over the receiving medium, leading to phenomena such as coalescence or bleeding, which reduce the print quality. By addition of a gelling agent, the fluid droplets may be changed into droplets in a gelled state. In the gelled state, the ink composition may not flow over the receiving medium. Thus, by addition of a gelling agent, the droplets of ink may be fixed onto the receiving medium before they solidify, and thus, the print quality may be improved.

A number of non-limiting examples of the gelling agent are: ketones such as laurone, stearone, di-n-dodecylketone, pyristone, 15-nonacosanone, palmitone, di-n-hexadecylketone, or oligo-ester compounds, the oligo-ester compounds being the reaction product of a poly-hydroxy component, such as pentaerythritol or glycerol and an carboxylic acid comprising an alkyl chain, such as stearic acid-, palmitic acid, arachidic acid, linoleic acid or myristic acid esters.

The hot melt ink composition according to the present invention is suitable to be used for applying an image onto a receiving medium using a inkjet printing apparatus.

In an aspect of the invention, a method for preparing the hot melt ink composition according to the present invention is provided, the method comprising the steps of:
 a. providing a binder, the binder being solid at room temperature and liquid at an elevated temperature;
 b. providing a crystalline material, the crystalline material being solid at room temperature and liquid at an elevated temperature;
 c. providing a colorant;
 d. providing a crystallization retardant;
 e. melt-mixing the binder, the crystalline material, the colorant and the crystallization retardant.

The binder as well as the crystalline material, the colorant and the crystallization retardant have to be provided. They may be provided in a liquid state or in a solid state. They may be provided simultaneously, or they may be provided subsequently. In case the components are provided subsequently, they may be provided in any suitable order. In case all the components of the hot melt inkjet ink composition are provided in a liquid state, the hot melt cleaning composition may be prepared by mixing the liquid components.

In case at least one of the components is in a solid state, then the at least one component in a solid state has to be molten. After the at least one component in a solid state is molten, the components may be melt mixed, thereby obtaining the hot melt ink composition. After the hot melt ink composition has been obtained, it may be solidified.

In an embodiment, the method further comprises the steps of:
 pouring molten hot melt ink composition into a mould
 allowing the hot melt ink composition to cool down and to solidify in the mould;
 separating the solidified hot melt ink composition from the mould.

The hot melt ink composition may be molten and subsequently poured into a mould. Alternatively, the hot melt ink composition, prepared by melt mixing may be poured into the mould after the melt mixing process, without having solidified. The mould may have any suitable shape, such that objects of the hot melt ink composition having a suitable shape may be provided. The objects of the hot melt ink composition may be e.g. pellets or cubes.

When the molten hot melt ink composition has been transferred into the mould, the hot melt ink composition may be allowed to cool down. Active cooling for increasing the cooling rate of the hot melt ink composition may optionally be provided. After the hot melt composition has cooled down, the resulting objects of the hot melt ink composition may be removed from the mould.

Alternatively, the hot melt composition may be extruded.

In an aspect of the invention, a method for printing an image onto a receiving medium is provided, the method comprising the steps of:
 a. providing the hot melt ink composition to an ink reservoir of a inkjet printer;
 b. melting the hot melt ink composition;
 c. jetting droplets of the molten hot melt ink composition onto a receiving medium, the molten hot melt ink composition having a temperature in the range of 80° C.-150° C.;
 d. allowing the droplets of the hot melt ink composition to cool down on the receiving medium, the hot melt ink composition thereby solidifying.

The hot melt ink composition may be provided to an ink reservoir of an inkjet printer. A print head of the inkjet printer may be provided with a melting unit, for melting the hot melt inkjet ink composition. Alternatively, the hot melt ink composition may be provided to the print head in a molten state. When the ink is in a molten state, droplets of the ink may be jetted by the ink jet printer onto a receiving medium. When jetting the droplets of ink onto the receiving medium, the droplets of ink may have a temperature in the range of from 80° C. to 150° C., for example from 110° C. to 135° C. When the droplets of the hot melt ink composition have been applied onto the receiving medium, thereby forming an image on the receiving medium, the ink may cool down and thereby solidify. Please note that the droplets of ink may already cool down to some extend during the flight, i.e. after they have been ejected through the orifice of the print head and before they contact the receiving medium. When the ink solidifies, the ink may not flow over the surface of the receiving medium anymore and the position of the droplets of ink on the receiving medium may be fixed. In case the ink composition comprises a gelling agent, the droplets of ink may at first go from a liquid state to a gelled state. In the gelled state, the droplets are not yet solid, but the movement of the droplet is restricted and the droplets of ink may not move on the receiving medium anymore. Afterwards, upon further cooling down, the droplets may go from the gelled state to a solid state. Once the ink composition has solidified, crystallization of the ink composition may take place. The ink composition may partially crystallize. For example, the crystalline material may crystallize from the hot melt ink composition. The crystallization retardant may also crystallize from the hot melt ink composition. Optionally, the crystallization retardant may co-crystallize with the crystalline material. Upon crystallization of at least a part of the hot melt ink composition, crystalline regions are formed in the ink applied onto the receiving medium.

DETAILED DESCRIPTION OF THE DRAWINGS

In the drawings, same reference numerals refer to same elements.

Figure 1A:
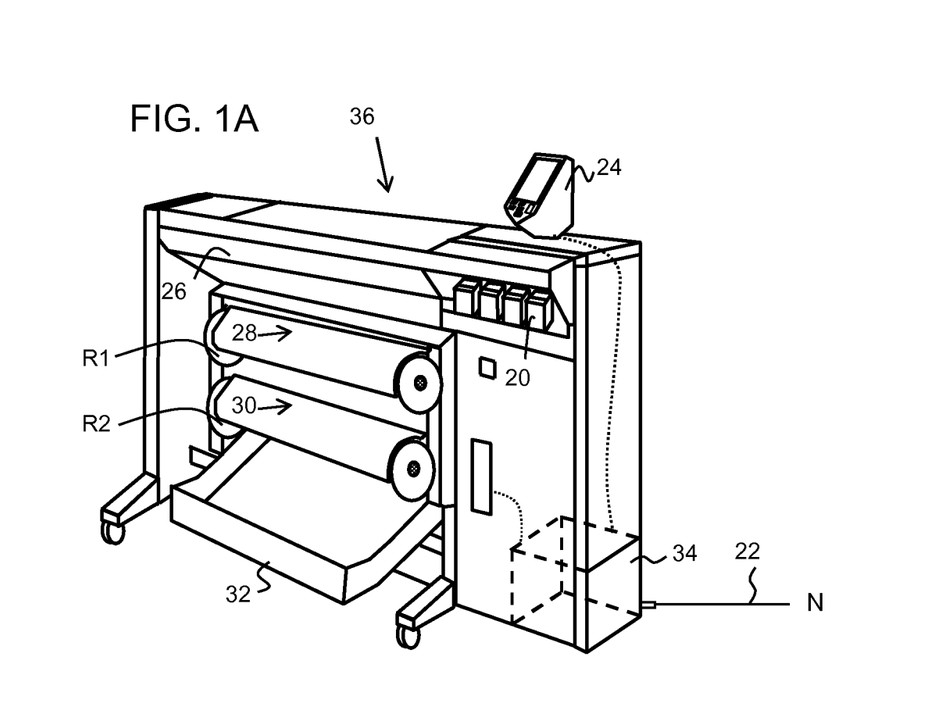
FIG. 1A shows a schematic representation of an image forming apparatus.
Figure 1B:
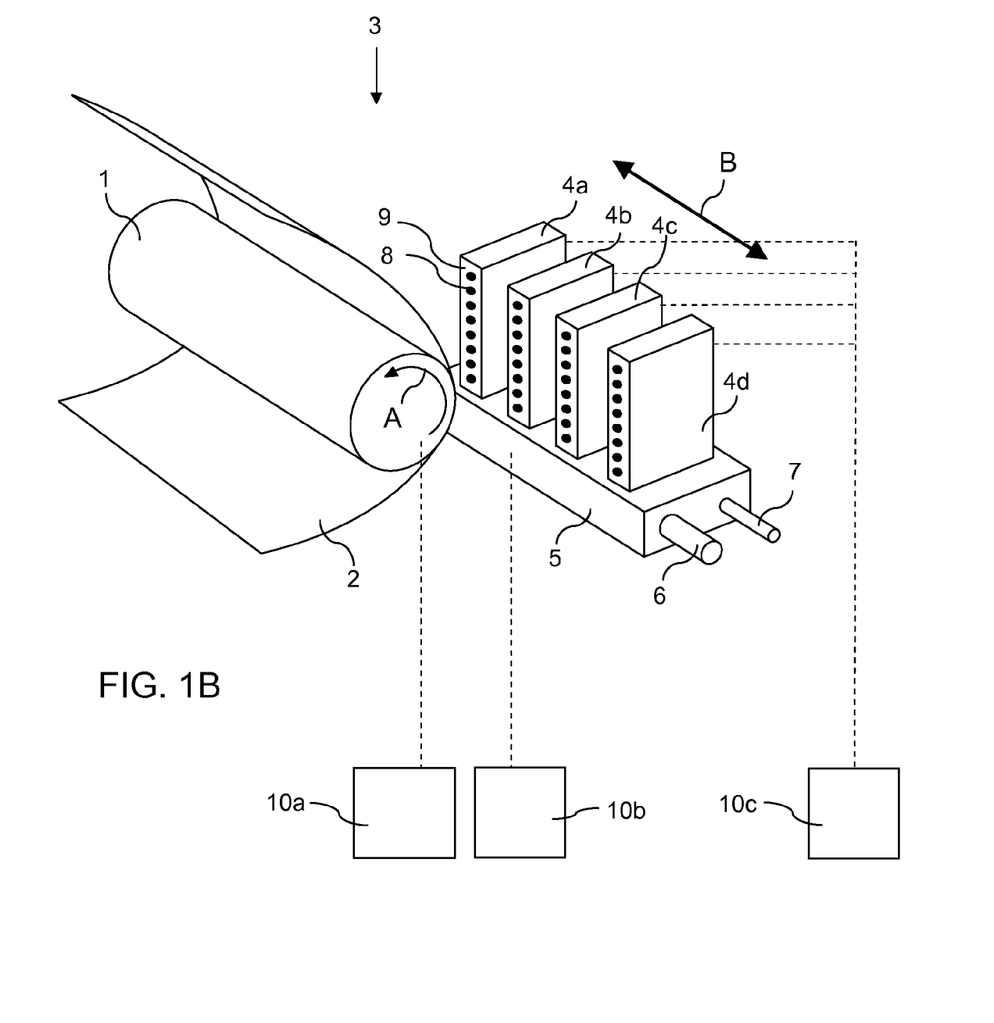
FIG. 1B shows an inkjet printing assembly

FIG. 1A shows an image forming apparatus 36, wherein printing is achieved using a wide format inkjet printer. The wide-format image forming apparatus 36 comprises a housing 26, wherein the printing assembly, for example the ink jet printing assembly shown in FIG. 1B is placed. The image forming apparatus 36 also comprises a storage means for storing image receiving member 28, 30, a delivery station to collect the image receiving member 28, 30 after printing and storage means for marking material 20. In FIG. 1A, the delivery station is embodied as a delivery tray 32. Optionally, the delivery station may comprise processing means for processing the image receiving member 28, 30 after printing, e.g. a folder or a puncher. The wide-format image forming apparatus 36 furthermore comprises means for receiving print jobs and optionally means for manipulating print jobs. These means may include a user interface unit 24 and/or a control unit 34, for example a computer.

Images are printed on a image receiving member, for example paper, supplied by a roll 28, 30. The roll 28 is supported on the roll support R1, while the roll 30 is supported on the roll support R2. Alternatively, cut sheet image receiving members may be used instead of rolls 28, 30 of image receiving member. Printed sheets of the image receiving member, cut off from the roll 28, 30, are deposited in the delivery tray 32.

Each one of the marking materials for use in the printing assembly are stored in four containers 20 arranged in fluid connection with the respective print heads for supplying marking material to said print heads.

The local user interface unit 24 is integrated to the print engine and may comprise a display unit and a control panel. Alternatively, the control panel may be integrated in the display unit, for example in the form of a touch-screen control panel. The local user interface unit 24 is connected to a control unit 34 placed inside the printing apparatus 36. The control unit 34, for example a computer, comprises a processor adapted to issue commands to the print engine, for example for controlling the print process. The image forming apparatus 36 may optionally be connected to a network N. The connection to the network N is diagrammatically shown in the form of a cable 22, but nevertheless, the connection could be wireless. The image forming apparatus 36 may receive printing jobs via the network. Further, optionally, the controller of the printer may be provided with a USB port, so printing jobs may be sent to the printer via this USB port.

FIG. 1B shows an ink jet printing assembly 3. The ink jet printing assembly 3 comprises supporting means for supporting an image receiving member 2. The supporting means are shown in FIG. 1B as a platen 1, but alternatively, the supporting means may be a flat surface. The platen 1, as depicted in FIG. 1B, is a rotatable drum, which is rotatable about its axis as indicated by arrow A. The supporting means may be optionally provided with suction holes for holding the image receiving member in a fixed position with respect to the supporting means. The inkjet printing assembly 3 comprises print heads 4a-4d, mounted on a scanning print carriage 5. The scanning print carriage 5 is guided by suitable guiding means 6, 7 to move in reciprocation in the main scanning direction B. Each print head 4a-4d comprises an orifice surface 9, which orifice surface 9 is provided with at least one orifice 8. The print heads 4a-4d are configured to eject droplets of marking material onto the image receiving member 2. The platen 1, the carriage 5 and the print heads 4a-4d are controlled by suitable controlling means 10a, 10b and 10c, respectively.

The image receiving member 2 may be a medium in web or in sheet form and may be composed of e.g. paper, cardboard, label stock, coated paper, plastic or textile. Alternatively, the image receiving member 2 may also be an intermediate member, endless or not. Examples of endless members, which may be moved cyclically, are a belt or a drum. The image receiving member 2 is moved in the sub-scanning direction A by the platen 1 along four print heads 4a-4d provided with a fluid marking material.

A scanning print carriage 5 carries the four print heads 4a-4d and may be moved in reciprocation in the main scanning direction B parallel to the platen 1, such as to enable scanning of the image receiving member 2 in the main scanning direction B. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving member 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6, 7. These guiding means 6, 7 may be rods as depicted in FIG. 1B. The rods may be driven by suitable driving means (not shown). Alternatively, the carriage 5 may be guided by other guiding means, such as an arm being able to move the carriage 5. Another alternative is to move the image receiving material 2 in the main scanning direction B.

Each print head 4a-4d comprises an orifice surface 9 having at least one orifice 8, in fluid communication with a pressure chamber containing fluid marking material provided in the print head 4a-4d. On the orifice surface 9, a number of orifices 8 is arranged in a single linear array parallel to the sub-scanning direction A. Eight orifices 8 per print head 4a-4d are depicted in FIG. 1B, however obviously in a practical embodiment several hundreds of orifices 8 may be provided per print head 4a-4d, optionally arranged in multiple arrays. As depicted in FIG. 1B, the respective print heads 4a-4d are placed parallel to each other such that corresponding orifices 8 of the respective print heads 4a-4d are positioned in-line in the main scanning direction B. This means that a line of image dots in the main scanning direction B may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 8.

Upon ejection of the marking material, some marking material may be spilled and stay on the orifice surface 9 of the print head 4a-4d. The ink present on the orifice surface 9, may negatively influence the ejection of droplets and the placement of these droplets on the image receiving member 2. Therefore, it may be advantageous to remove excess of ink from the orifice surface 9. The excess of ink may be removed for example by wiping with a wiper and/or by application of a suitable anti-wetting property of the surface, e.g. provided by a coating.

EXPERIMENTS AND EXAMPLES

Materials

As a crystalline material, compound nr 8 European Patent EP1221467 was used. As a binder, the resin according to example 2 of U.S. Pat. No. 7,084,190 B2, was used. Pentaerythritoltetrastearate was obtained from Nippon oil & fat corporation. As a nucleating agent, compound N from U.S. Pat. No. 6,685,953 B1 was used. As a dye, acid Red 143 was used. As a pigment, pigment black 7 from Clariant was used.

p-methoxyhexylbenzoate was prepared by providing equimolar amount of p-methoxybenzoic acid and 1-hexanol (0.5 mole each) and 30 mL of xylene in a round-bottom flask equipped with Dean-Stark equipment and provided with a nitrogen atmosphere. The mixture was heated to reflux temperature. The mixture was allowed to react at reflux temperature for 24 hours. During the reaction time, the water formed was removed via the Dean Stark equipment. After the mixture has reacted at reflux temperature for 24 hours, the mixture was allowed to cool down and the solvent was removed under reduced pressure and a resin was obtained. The product was transferred into an aluminum dish and dried for 16 h in an over at a temperature of 150° C. and a pressure of $5*10^{-2}$ mbar.

Methods

Viscosity

Viscosity was measured according to DIN 53018 with a HAAKE Rheostress RS 600 rheometer equipped with a HAAKE Universal Temperature Controller using plate-plate geometry sensor system (PP60) at 140° C. (Controlled Rate Method, wherein the rate is $10 \text{ s}^{-1}$–$1000 \text{ s}^{-1}$).

Wheel Imprint:

Prints were made using a hot melt ink composition on a receiving medium using an Océ Colorwave 600 printer. The prints were mono-color prints and the amount of ink applied per surface unit was constant throughout the print. The temperature of the receiving medium was 32° C. As a receiving medium, Oce Top Colour 90 g/m² paper was used. The ink was allowed to solidify and crystallize after being applied onto the receiving medium. Before the printed image was applied to the receiving medium, the receiving medium was fed to the printing apparatus. The printing apparatus is provided with a wheel, to transport the receiving medium towards the image forming unit of the printer. Ink applied to parts of the receiving medium that have been into contact with this wheel for paper transport may have a different appearance than ink applied onto parts of the receiving medium that have not been into contact with this wheel for paper transport. This phenomenon is called wheel imprint. Wheel imprint is caused by differences in crystallization behavior of the ink, between ink applied onto parts of the receiving medium that have been into contact with this wheel for paper transport and ink applied onto parts of the receiving medium that have not been into contact with this wheel for paper transport.

Wheelimprint is measured using one of the following methods:

1. After solidification, it is determined whether the appearance of the printed image is homogeneous throughout the surface of the printed image. The results are judged by comparing the results of the test with references and are given a value. A value of ++ corresponds to a very good result (homogeneous appearance throughout print surface); a value of + corresponds to a good result (only minor differences in appearance in a narrow region of the print surface); a value of 0 corresponds to a moderate result (small differences in appearance throughout the print surface); a value of—corresponds to a bad result (substantial differences in appearance throughout the print surface); a value of—corresponds to a very bad result (much difference in appearance throughout print surface).

2. After solidification, the printed image is investigated by optical transmission microscopy. The diameter of the crystals is determined, both in the printed image on a part of the receiving medium that has been in contact with the wheel and in the printed image on a part of the receiving medium that has not been in contact with the wheel. In case there is no wheel imprint, the average diameter of the crystals is within a range of 60 μm-90 μm, and at least 90% of the crystals observed have a diameter falling within the specified range. In case there is wheel imprint, the average diameter of the crystals is within a range of 120 μm-180 μm, and at least 50% of the crystals have a diameter falling within the specified range.

Crystallization Time

Prints were made in accordance with the method described with respect to "wheel imprint". Once the droplets of ink were applied onto the receiving medium, the behavior of the ink was monitored using a monitoring system comprising a camera and a light source. When the ink is applied on the receiving medium, the ink is still liquid (wet) and forms a glossy layer on the receiving medium. The glossy layer reflects a large amount of light. When the ink cools and eventually solidifies/crystallizes, the gloss diminishes and therefore the reflectance of the ink decreases. Crystallization time is measured by following the reflectance of the ink layer in the course of time. The crystallization time is set as the time at which 93% of the material has solidified.

EXAMPLES

Several ink compositions were prepared. Ink compositions Ex 1 and Ex 2 comprise a crystallization retardant and are inks according to the present invention, whereas ink compositions CE 1 and CE 2 are not ink compositions according to the present invention.

Production Example 1

100 grams of a mixture of crystalline material and binder, wherein the mass ratio crystalline material: binder was 70:30, 3 grams of pentaerythritoltetrastearate, 1.5 grams of the nucleating agent, 2 grams of the dye and 3 grams of p-methoxyhexylbenzoate were combined in a vessel, heated to 150° C. and mixed. The mixture was stirring until all material was melted. The obtained ink composition was allowed to cool down to room temperature, after which the ink composition solidified, yielding ink composition Ex 1. Hot melt ink composition Ex 1 has a viscosity r) of 9.7 mPa.s at 140° C. The CT of EX 1is 6.4 s.

Production Example 2

100 grams of a mixture of crystalline material and binder, wherein the mass ratio crystalline material: binder was 65:35, 2.3 grams of the pentaerythritoltetrastearate , 1.5 grams of the nucleating agent, 2.5 grams of the pigment and 4 grams of p-methoxyhexylbenzoate were combined in a vessel, heated to 150° C. and mixed. The mixture was stirring until all material was melted. The obtained ink composition was allowed to cool down to room temperature, after which the ink composition solidified, yielding ink composition Ex 2. Hot melt ink composition Ex 2 has a viscosity r) of 10.1 mPa.s at 140° C. The CT of EX 2 is 2.5 s.

Comparative Examples

Comparative Production Example 1

100 grams of a mixture of crystalline material and binder, wherein the mass ratio crystalline material: binder was 70:30, 3 grams of the pentaerythritoltetrastearate, 1.5 grams of the nucleating agent and 2 grams of the dye were combined in a vessel, heated to 150° C. and mixed. The mixture was stirring until all material was melted. The obtained ink composition was allowed to cool down to room temperature, after which the ink composition solidified, yielding ink composition CE 1. Hot melt ink composition CE 1 has a viscosity n of 10.4 mPa.s at 140° C. The CT of CE 1 is 4.6 s.

Comparative Production Example 2

100 grams of a mixture of crystalline material and binder, wherein the mass ratio crystalline material: binder was 65:35, 2.3 grams of the pentaerythritoltetrastearate, 1.5 grams of the nucleating agent and 2.5 grams of the pigment were combined in a vessel, heated to 150° C. and mixed. The mixture was stirring until all material was melted. The obtained ink composition was allowed to cool down to room temperature, after which the ink composition solidified, yielding ink composition CE 2. Hot melt ink composition CE 2 has a viscosity n of 10.5 mPa.s at 140° C. The CT of CE 2 is 3.5 s.

Comparison Experiments

In a first comparison experiment, prints made using the Oce Colorwave 600 on Oce Top Colour 90 g/m² paper as a receiving medium. Prints made with ink composition Ex 1 and Ex 2 were compared to prints made with ink composition CE 1 and CE 2 with regard to wheel imprint. The results are summarized in table 2.

TABLE 2

| ink composition | wheel imprint |
|---|---|
| EX 1 | + |
| CE 1 | 0 |
| EX 2 | ++ |
| CE 2 | -- |

Prints made with ink compositions EX 1 and EX 2, show better results with respect to wheel imprint than prints made with ink compositions CE 1 and CE 2. Thus, prints made with ink compositions EX 1 and EX 2, which are ink compositions according to the present invention, have a more homogeneous appearance than prints made with ink composition CE 1 or CE 2.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention claimed is:

1. A hot melt ink composition, the hot melt ink composition being solid at room temperature and in a liquid state at an elevated temperature, comprising a binder, a colorant, a crystalline material, and a crystallization retardant, wherein the crystalline material is a di-substituted compound and the crystallization retardant is a mono-substituted derivative of the crystalline material, wherein the crystalline material is a component having the following general formula:

wherein:

$R_2$ is a C1-12 linear alkane diyl or a 5-12 alkane diyl containing a cyclic group;

$B_1$ and $B_2$ may be the same or different and are both selected from the group of —C(O)O—, —OC(O)—, —C(O)N(H)—, —N(H)C(O)— and —O—;

where $R_1$ and $R_1'$ are the same or different and are selected from a C1-8 alkyl or a C1-8 alkoxy group, and n and m are the same or different and are equal to 0, 1, 2 or 3.

2. The hot melt ink composition according to claim 1, wherein the crystallization retardant has the following general formula:

wherein $R_3$ is selected from a C1-8 alkyl or a C1-8 alkoxy group, $R_4$ is a C1-12 linear or branched alkyl and n' is equal to 0, 1, 2 or 3 and $B_1$ is selected from the group of —C(O)O—, —OC(O)—, —C(O)N(H)—, —N(H)C(O)— and —O—.

3. The hot melt ink composition according to claim 1, wherein $B_1$ is -C(O)O— and $B_2$ is —OC(O)—, or $B_1$ is —C(O)N(H)—and $B_2$ is —N(H)C(O)—, or $B_1$ and $B_2$ are —O—.

4. The hot melt ink composition according to claim 1, wherein $R_1$ and $R_1'$ are the same.

5. The hot melt ink composition according to claim 1, wherein the hot melt inkjet ink composition has a viscosity in the range of 5 mPas-15 mPa s at a temperature of 140° C., when measured according to DIN 53018.

6. The hot melt ink composition according to claim 1, wherein the hot melt ink composition further includes a nucleating agent.

7. The hot melt ink composition according to claim 1, wherein the crystalline material is a compound according to wherein $R_1$ and $R_1'$ are the same or different and are selected from a C1-8 alkyl or a C1-8 alkoxy group, $R_2$ is a C1-12 linear alkane diyl or a C5-12 alkane diyl containing a cyclic group, and n and m are the same or different and are equal to 0, 1, 2 or 3, and wherein the crystallization retardant is a compound according to wherein $R_3$ is selected from a C1-8 alkyl or a C1-8 alkoxy group, $R_4$ is a C1-12 linear or branched alkyl and n' is equal to 0, 1, 2 or 3.

8. The hot melt ink composition according to claim 1, wherein in the liquid state of the ink composition the crystallization retardant provides a viscosity lowering effect to the ink composition.

9. Method for preparing the hot melt ink composition according to claim 1, the method comprising the steps of:
   a. providing a binder, the binder being solid at room temperature and liquid at an elevated temperature;
   b. providing a crystalline material, the crystalline material being solid at room temperature and liquid at an elevated temperature;
   c. providing a colorant;
   d. providing a crystallization retardant;
   e. melt-mixing the binder, the crystalline material, the colorant and the crystallization retardant.

10. Method for printing an image onto a receiving medium, the method comprising the steps of:
   a. providing the hot melt ink composition according to claim 1 to an ink reservoir of a inkjet printer;
   b. melting the hot melt ink composition;
   c. jetting droplets of the molten hot melt ink composition onto a receiving medium, the molten hot melt ink composition having a temperature in the range of 80° C.-150° C.;
   d. allowing the droplets of the hot melt ink composition to cool down on the receiving medium, the hot melt ink composition thereby solidifying.

* * * * *